United States Patent
Araki (10) Patent No.: US 9,286,048 B2
(45) Date of Patent: Mar. 15, 2016

(54) APPARATUS, NON-TRANSITORY COMPUTER READABLE INFORMATION RECORDING MEDIUM AND INFORMATION RECORDING METHOD THAT DETERMINE IDENTIFICATION INFORMATION FOR IDENTIFYING A PROGRAM THAT HAS ISSUED A USE REQUEST

(71) Applicant: Ryoji Araki, Fukuoka (JP)

(72) Inventor: Ryoji Araki, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/164,393

(22) Filed: Jan. 27, 2014

(65) Prior Publication Data
US 2014/0229931 A1    Aug. 14, 2014

(30) Foreign Application Priority Data

Feb. 8, 2013  (JP) .................................. 2013-023466
Sep. 26, 2013  (JP) .................................. 2013-199767

(51) Int. Cl.
*G06F 9/445*  (2006.01)
*G06F 17/30*  (2006.01)

(52) U.S. Cl.
CPC ............ *G06F 8/61* (2013.01); *G06F 17/30115* (2013.01); *G06F 17/30144* (2013.01)

(58) Field of Classification Search
None
See application file for complete search history.

(56) References Cited

U.S. PATENT DOCUMENTS

| | | | |
|---|---|---|---|
| 6,718,372 B1 * | 4/2004 | Bober | 709/217 |
| 8,719,535 B1 * | 5/2014 | Palsule et al. | 711/165 |
| 2004/0210796 A1 * | 10/2004 | Largman | G06F 11/1417 714/20 |
| 2007/0192385 A1 * | 8/2007 | Prahlad et al. | 707/202 |
| 2009/0144285 A1 * | 6/2009 | Chatley et al. | 707/10 |
| 2009/0296136 A1 | 12/2009 | Tanaka | |
| 2010/0082555 A1 | 4/2010 | Ogawa et al. | |
| 2010/0169678 A1 * | 7/2010 | Kozuka | G06F 1/3221 713/310 |
| 2010/0228801 A1 | 9/2010 | Taniguchi | |
| 2010/0332452 A1 * | 12/2010 | Hsu et al. | 707/640 |
| 2011/0283123 A1 * | 11/2011 | Shigemura | G06F 1/3221 713/320 |
| 2012/0117113 A1 | 5/2012 | Fujisawa | |
| 2012/0206754 A1 | 8/2012 | Aota | |
| 2013/0138618 A1 * | 5/2013 | Chatley et al. | 707/694 |

(Continued)

FOREIGN PATENT DOCUMENTS

| | | |
|---|---|---|
| JP | 2006-079211 | 3/2006 |
| JP | 2009-194862 | 8/2009 |

(Continued)

OTHER PUBLICATIONS

Extended European Search Report issued Apr. 15, 2014 in Patent Application No. 14152322.5.

*Primary Examiner* — Chameli Das
(74) *Attorney, Agent, or Firm* — Oblon, McClelland, Maier & Neustadt, L.L.P.

(57) ABSTRACT

An apparatus, method, and computer readable medium that determine, from among a plurality of storage devices, whether an accessed storage device that has been accessed is a first storage device, determine, for a use request for using the first storage device, identification information for identifying a program that has issued the use request through a predetermined interface, in response to the accessed storage device being the first storage device, and stores the identification information in a second storage device different from the first storage device, in response to the accessed storage device being the first storage device.

18 Claims, 5 Drawing Sheets

(56) References Cited

U.S. PATENT DOCUMENTS

2013/0275390 A1\* 10/2013 Ozzie et al. .................. 707/687
2014/0181399 A1\* 6/2014 Hsu et al. ..................... 711/114

FOREIGN PATENT DOCUMENTS

JP     2009-290464     12/2009
JP     2012-166500     9/2012

\* cited by examiner

| APPLICATION ID | THREAD NAME | WRITING TARGET PATH | SIZE | OPERATION TYPE NAME | DATA AND TIME INFORMATION |
|---|---|---|---|---|---|
| ... | ... | ... | ... | ... | ... |
| ... | ... | ... | ... | ... | ... |
| ... | ... | ... | ... | ... | ... |

APPARATUS, NON-TRANSITORY COMPUTER READABLE INFORMATION RECORDING MEDIUM AND INFORMATION RECORDING METHOD THAT DETERMINE IDENTIFICATION INFORMATION FOR IDENTIFYING A PROGRAM THAT HAS ISSUED A USE REQUEST

BACKGROUND OF THE INVENTION

1. Field of the Invention

The present invention relates to an apparatus, a non-transitory computer readable information recording medium and an information recording method.

2. Description of the Related Art

In the related art, in an image forming apparatus, it is possible to install an application platform (hereinafter, simply referred to as a "platform") including an Application Program Interface (API) that is open (for example, see Japanese Laid-Open Patent Application No. 2006-079211). In such an image forming apparatus in which the platform is installed, it is possible to install, on the platform, an application program (hereinafter, simply referred to as an "application") created using the API.

In the related art, a platform is distributed in such a way that it is recorded in an insertable and extractable recording medium such as a Secure Digital (SD) card (hereinafter, simply referred to as an "external recording medium").

On the other hand, there is an application installed on a platform that has a function of writing, in a file or the like, information that is generated during execution of a process. As a place to which such a file is stored, a storage part such as a Hard Disk Drive (HDD) or a platform that an image forming apparatus has or an external recording medium used to distribute an application is used in the related art. Since a HDD has a large storage capacity, a HDD is suitable as a place in which information is written. However, after an image forming apparatus having the HDD enters a power saving state, power supply to the HDD is stopped. Therefore, in particular, as for such an application that operates also during the power saving state, an external recording medium is used as a place in which information is stored. Thus, an external recording medium is used (as a distribution medium) to distribute a platform or an application, and also, (as a storage part) to store information, in the related art.

Note that, in the related art, a platform is allowed to start only in a case where an external recording medium is inserted in an image forming apparatus, for the purpose of preventing unauthorized copying of the platform, or the like. Therefore, in a state when the platform is being operated, a state of the external recording medium being inserted is guaranteed. Therefore, an application can determine that an external recording medium is present, and thus, can use the external recording medium to store information therein.

SUMMARY OF THE INVENTION

According to one aspect of the present invention, an apparatus in which it is possible to install a program includes a determination part that determines, for a use request for using a first storage part, identification information for identifying the program that has issued the use request through a predetermined interface; and a storage unit that stores the identification information in a second storage part different from the first storage part.

Other objects, features and advantages of the present invention will become more apparent from the following detailed description when read in conjunction with the accompanying drawings.

DETAILED DESCRIPTION OF THE EMBODIMENT

For the sake of convenience, a problem to be solved by the embodiment will be described first.

In the related art described above, the costs of external recording media to be used to distribute platforms are paid by a person who sells an image forming apparatus. Thus, a person who sells an image forming apparatus bears a heavy burden. Further, a user bears a workload for keeping and managing external recording media and so forth. As a common method of distributing a program, there is a method in which a program is downloaded from a predetermined server in the Internet. However, many users do not wish to connect their image forming apparatuses to the Internet, or the like, and thus, it is not possible to use this method for all the users.

Therefore, the inventor et al., considered a method in which, before the shipment of an image forming apparatus, a platform is stored in a storage device incorporated in the image forming apparatus. Thereby, even without distribution of a platform using an external recording medium, distribution of a platform using the Internet, or the like, it is possible to distribute a platform together with an image forming apparatus. Further, in a case where a platform is stored in a storage device incorporated in an image forming apparatus, it is possible to reduce a likelihood of unauthorized copying of the platform in comparison to a case where the platform is stored in an external recording medium.

However, in a case where an external recording medium is thus not used in distribution of a platform, a state of an external recording medium being inserted is not guaranteed at a time when a platform is being operated. Therefore, it is necessary to specially provide, for storing information, a storage device such that it is incorporated in an image forming apparatus and power is supplied thereto even in a power saving state.

However, a storage device has a limited service life. An external recording medium can be easily replaced with a new one. However, a storage device incorporated in an image forming apparatus may be mounted on the same board as other hardware, and thus, it may be difficult to replace it with a new one. Further, if the service life of the incorporated storage device is short, the reliability of the product (image forming apparatus) may be degraded.

The service life of a storage device depends on the number of writing operations to a great extent. Therefore, it is preferable to provide a guideline concerning a writing frequency for a storage device and develop an application in keeping with the guideline.

However, for example, without a mechanism such that it is determined whether the guideline is being kept, the guideline may not function well. Such a problem may be common to various apparatuses in which applications that have functions of writing information in storage devices are installed.

The embodiment of the present invention has been devised in consideration of this point, and an objective of the embodiment is to assist in obtaining information concerning a state how a storage device is used (a use state of a storage device).

Figure 1:
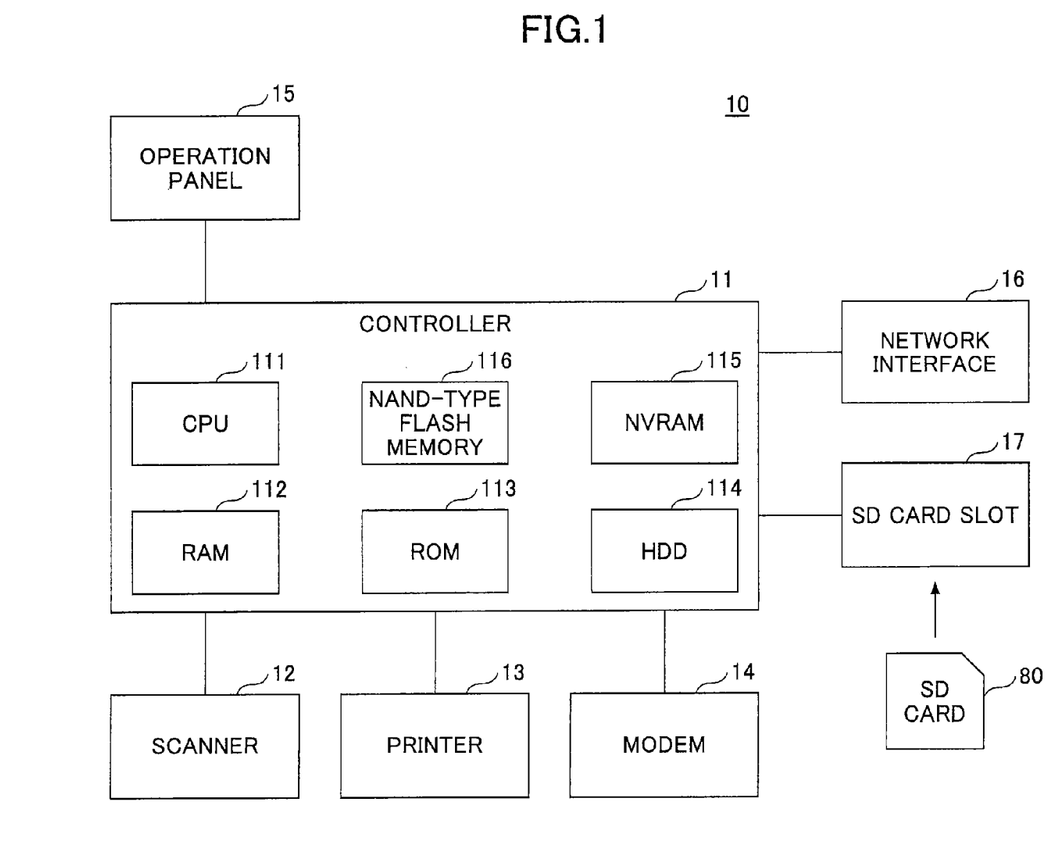
FIG. 1 is a diagram showing an example of a configuration of hardware in an image forming apparatus according to an embodiment of the present invention.

Below, based on the drawings, the embodiment of the present invention will be described. FIG. 1 is a diagram showing a hardware configuration example of an image forming apparatus according to the embodiment of the present invention. In FIG. 1, the image forming apparatus 10 includes hardware parts such as a controller 11, a scanner 12, a printer 13, a modem 14, an operation panel 15, a network interface 16 and an SD card slot 17.

The controller 11 includes a board on which a CPU 111, a RAM 112, a ROM 113, a HDD 114, a NVRAM 115 and a NAND (Not AND)-type flash memory 116 are installed. The ROM 113 stores various programs and data to be used by the programs. The RAM 112 is used as a storage area in which a program is to be loaded and a work area for the loaded program. The CPU 111 executes a program loaded in the RAM 112 to implement various functions. The HDD 114 and the NAND-type flash memory 116 store programs and various sorts of data to be used by the programs. According to the embodiment, the NAND-type flash memory 116 is used. However, a flash memory of other than NAND type, or another type of a non-volatile memory may be used instead. In the NVRAM 115, a counter value updated according to a progress of a job, or the like, is stored, for example.

The scanner 12 is a hardware part (image reading part) that reads image data from an original document. The printer 13 is a hardware part (printing part) that prints print data onto printing paper. The modem 14 is a hardware part used to connect the image forming apparatus 10 to a telephone line and is used to carry out transmission and reception of image data through facsimile communication. The operation panel 115 is a hardware part including input devices such as buttons for receiving inputs from a user and a display device such as a liquid crystal panel. The liquid crystal panel may have a touch-panel function. In this case, the liquid crystal panel also has a function as an input device. The network interface 16 is a hardware part for connecting the image forming apparatus 10 to a (wired and/or wireless) network such as a LAN. The SD card slot 17 is used to read a program stored in a SD card 80. Noted that another recording medium (for example, a CD-ROM, a Universal Serial Bus (USB) memory or the like) may be used instead of the SD card 80. That is, a specific type of a recording medium that may be used instead of the SD card 80 is not limited to a certain one. In this case, the SD card slot 17 is substituted for by another type of a hardware part corresponding to a type of a recording medium to be actually used.

Note that according to the embodiment, in a case where the image forming apparatus 10 is in a power saving state, the power is not supplied to the HDD 114 among the writeable non-volatile storage devices. On the other hand, the power is supplied to the NVRAM 115, the NAND-type flash memory 116 and the SD card slot 17 (SD card 80) even in the power saving state. However, such a configuration is merely one example, and another configuration may be applied instead. Further, the power saving state means such a state that the power supply to some of the hardware parts is limited. The power saving state may have a plurality of levels depending on the number of hardware parts for which the power supply is restricted.

Figure 2:
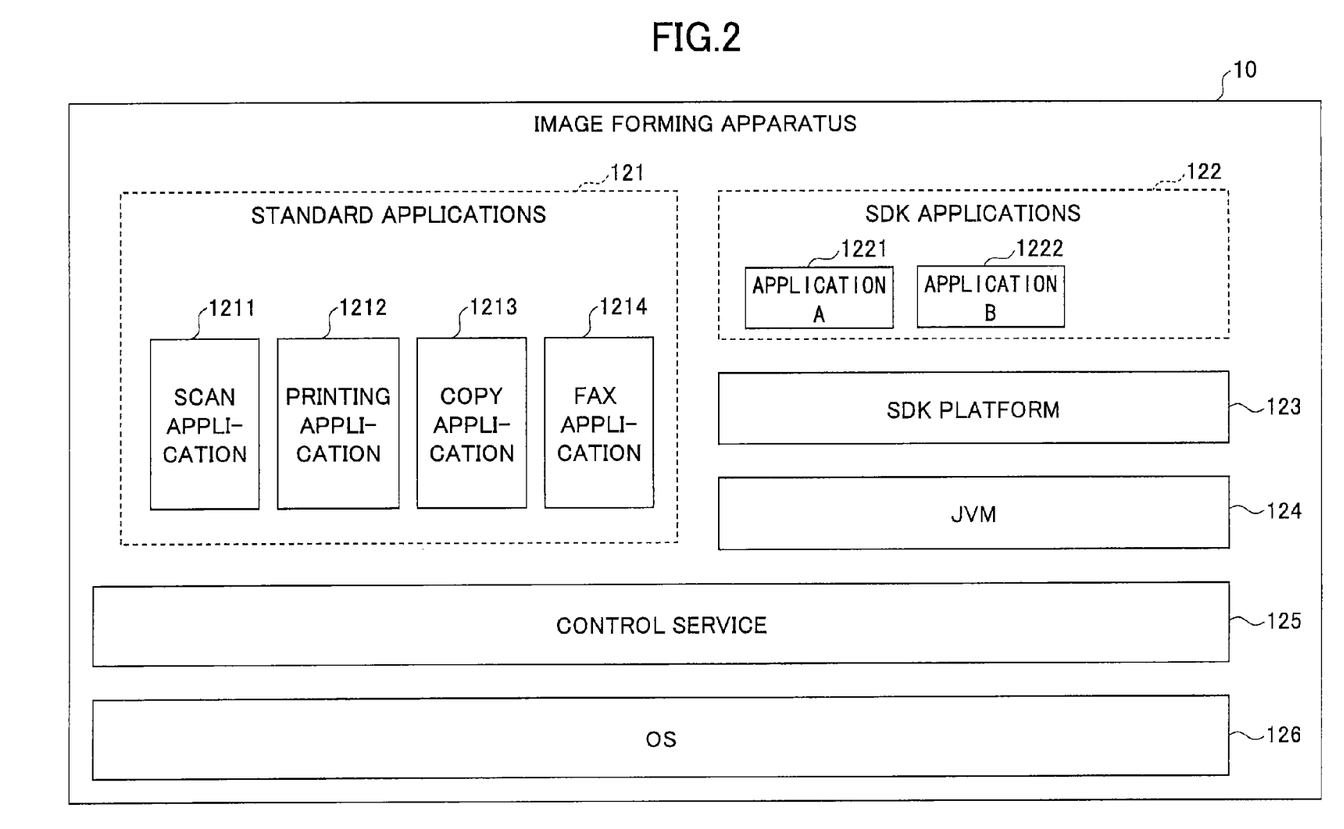
FIG. 2 is a diagram showing an example of a configuration of software in the image forming apparatus according to the embodiment.

FIG. 2 shows an example of a configuration of software in the image forming apparatus 10 according to the embodiment. In FIG. 2, the image forming apparatus 10 includes standard applications 121, Software Development Kit (SDK) applications 122, a SDK platform 123, a JVM 124, a control service 125, an OS 126 and so forth.

The standard applications 121 are a collection of application programs normally (previously at a time of the shipment) implemented in the image forming apparatus 10. FIG. 2 shows, as examples thereof, a scan application 1211, a printing application 1212, a copy application 1213 and a facsimile (FAX) application 1214. The scan application 1211 executes a scan job using the scanner 12 and so forth. The copy application 1213 executes a copy job using the scanner 12, the printer 13 and so forth. The facsimile application 1214 executes a facsimile transmission job and a facsimile reception job using the modem 14 and so forth. Note that the scanner 12, the printer 13, and the modem 14 are examples of hardware parts unique to the image forming apparatus 10.

The control service 125 is a group of software modules that provide functions for controlling various hardware resources and so forth, to host programs such as the standard applications 121, the SDK platform 123 and so forth. The control service 125 has, for example, functions concerning network communication, functions of controlling the scanner 12, functions of controlling the printer 13, functions of managing memories, and so forth.

The SDK applications 122 are application programs (also referred to as plug-ins) additionally installed after the shipment of the image forming apparatus 10 for the purpose of extending the functions of the image forming apparatus 10. In FIG. 2, as examples of the SDK applications 122, an application A 1221 and an application B 1222 are shown. The application A 1221 and the application B 1222 are merely examples, and in the embodiment, the functions of the application A 1221 and the application B 1222 are not limited to specific ones.

The SDK platform 123 includes APIs to be used to develop the SDK applications 122, and also, provides an execution environment for the SDK applications 122. Configurations of the APIs may be, for example, functions, or may be classes and methods of the classes according to object orientation or the like. According to the embodiment, the APIs are provided by a class group of Java (registered trademark). Below, the APIs provided by the SDK platform 123 will be referred to as "SDK APIs". For example, the SDK platform 123 provides a SDK API concerning a scan function, a SDK API concerning a printing function, a SDK API concerning a copy function, and so forth, to the SDK applications 122. The SDK APIs are open, and the SDK applications 122 can be developed also by a third vendor or the like.

The JVM 124 is a Java (registered trademark) Virtual Machine (VM). In the embodiment, the SDK applications 122 are implemented as applications of Java (registered trademark). The SDK applications 122, the SDK platform 123 and so forth can use APIs provided by a class group of Java (registered trademark) standard that the JVM 124 has.

The OS 126 is a so-called Operating System (OS). Respective sets of software in the image forming apparatus 10 operate as processes or threads on the OS 126.

In the embodiment, the program files of the respective sets of software shown in FIG. 2 are stored in the NAND-type flash memory 116 at a time of the shipment of the image forming apparatus 10. However, some or all of these program files may be stored in the HDD 114. Further, the SDK applications 122 installed after the shipment may be stored in the SD card 80.

According to the embodiment, such a circumstance is assumed that a guideline is provided concerning access (in particular, writing) to the NAND-type flash memory 116 by the SDK applications 122. For example, according to the guideline, upper limits are prescribed for the number of writing operations per unit time and a writing size. A developer who develops the SDK applications 122 is required to implement the SDK applications 122 in such a manner that access to the NAND-type flash memory 116 will fall within the upper limits.

On the other hand, the image forming apparatus 10 according to the embodiment has a mechanism of assisting in checking whether the respective SDK applications 122 are implemented in conformity with the guideline.

Figure 3:
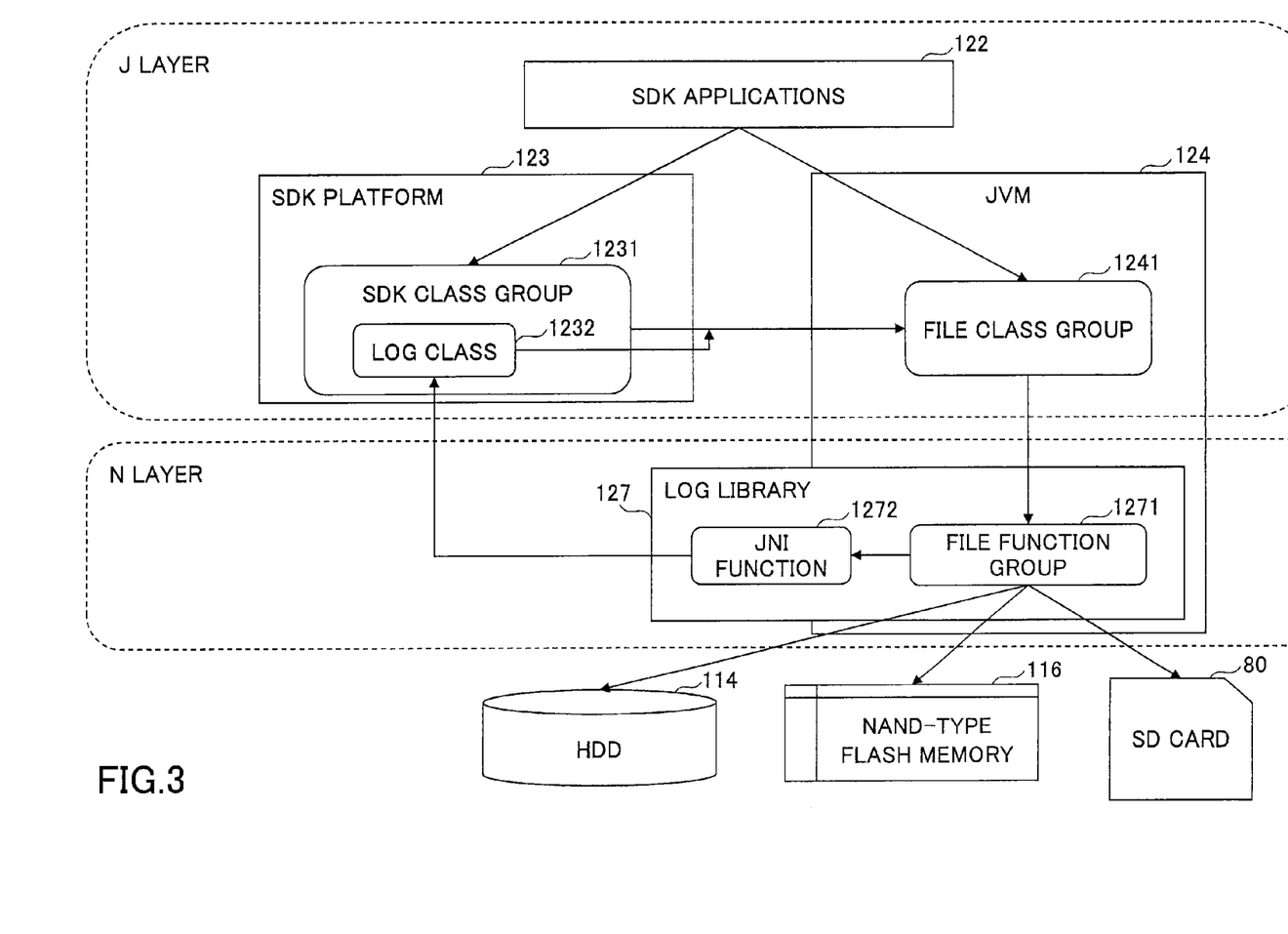
FIG. 3 is a diagram showing an example of a functional configuration concerning a check mechanism for checking a state of accessing a NAND-type flash memory.

FIG. 3 shows an example of a functional configuration concerning the mechanism of checking a state as to how the NAND-type flash memory 116 is accessed. The program group shown in FIG. 3 is classified into a J layer and a N layer. The J layer is implemented according to Java (registered trademark), and is a layer that has been converted into such a state that the J layer can operate on the JVM 124 such as Java (registered trademark) bytecode or the like. The N layer is implemented according to, for example, C language, C++ or the like, and is a layer that has been converted into a native code.

In FIG. 3, the JVM 124 includes a file class group 1241. The file class group 1241 is a class group, from among the Java (registered trademark) standard class groups, concerning file operations (access to a file). As specific examples of the file operation, opening a file, closing a file, writing to a file, reading from a file, generating a folder or directory, and so forth, can be cited.

To the JVM 124, a log library 127 is linked. The log library 127 includes a file function group 1271, a JNI function 1272 and so forth. The file function group 1271 is a standard function group for file operations in C language that generates writing to a file such as an "open" function, a "close" function, a "write" function, a function of "generating a folder", and so forth. However, the file function group 1271 included in the log library 127 is modified so that it invokes the JNI function 1272 using log information concerning file operations as arguments. The original function group concerning file operations is replaced with the file function group 1271 in the log library 127. That is, such a configuration is provided that, invoking the functions concerning file operations by the file class group 1241 is hooked by the file function group 1271. A change in a function to be invoked from the original function to the modified function can be carried out according to a known method. For example, it is possible to change a function to be invoked by modifying a linking manner.

The JNI function 1272 is a function for transmitting invoking by the file function group 1271 in the N layer to a log class 1232 in the J layer through an arrangement of the Java (registered trademark) Native Interface (JNI).

The SDK platform 123 includes a SDK class group 1231. The SDK class group 1231 is a class group of Java (registered trademark) providing the SDK APIs. In the SDK class group 1231, the log class 1232 is included. The log class 1232 is a class that records log information concerning file operations in the HDD 114.

In FIG. 3, an arrow extending from the SDK applications 122 to the SDK class group 1231 indicates invoking the SDK APIs by the SDK applications 122. An arrow extending from the SDK applications 122 to the file class group 1241 indicates involving the file class group 1241 by the SDK applications 122.

An arrow extending from the SDK class group 1231 to the file class group 1241 indicates invoking the file class group 1241 by the SDK class group 1231. For example, the SDK class group 1231 that generates certain information such as image data and stores the generated information in a file uses the file class group 1241 to implement storing the information in the file. Note that invoking the file class group 1241 by the SDK class group 1231 is hidden from the SDK application 122. That is, a file operation may be carried out even in a case where the SDK application 122 is not clearly aware of the file operation.

An arrow extending from the log class 1232 to the file class group 1241 indicates invoking the file class group 1241 when the log class 1232 records log information.

An arrow from the file class group 1241 to the file function group 1271 indicates transmitting a request for a file operation, made to the file class group 1241, to the file function group 1271. Arrows extending from the file function group 1271 to the HDD 114, the NAND-type flash memory 116, and the SD card 80 indicate access to the respective storage devices by the file function group 1271 for carrying out file operations. However, strictly speaking, access to the respective storage devices is carried out further using the OS 126 and a driver program (not shown). Further, which one of the storage devices is to be accessed is identified by the path name of the file that is to be operated.

Figure 4:
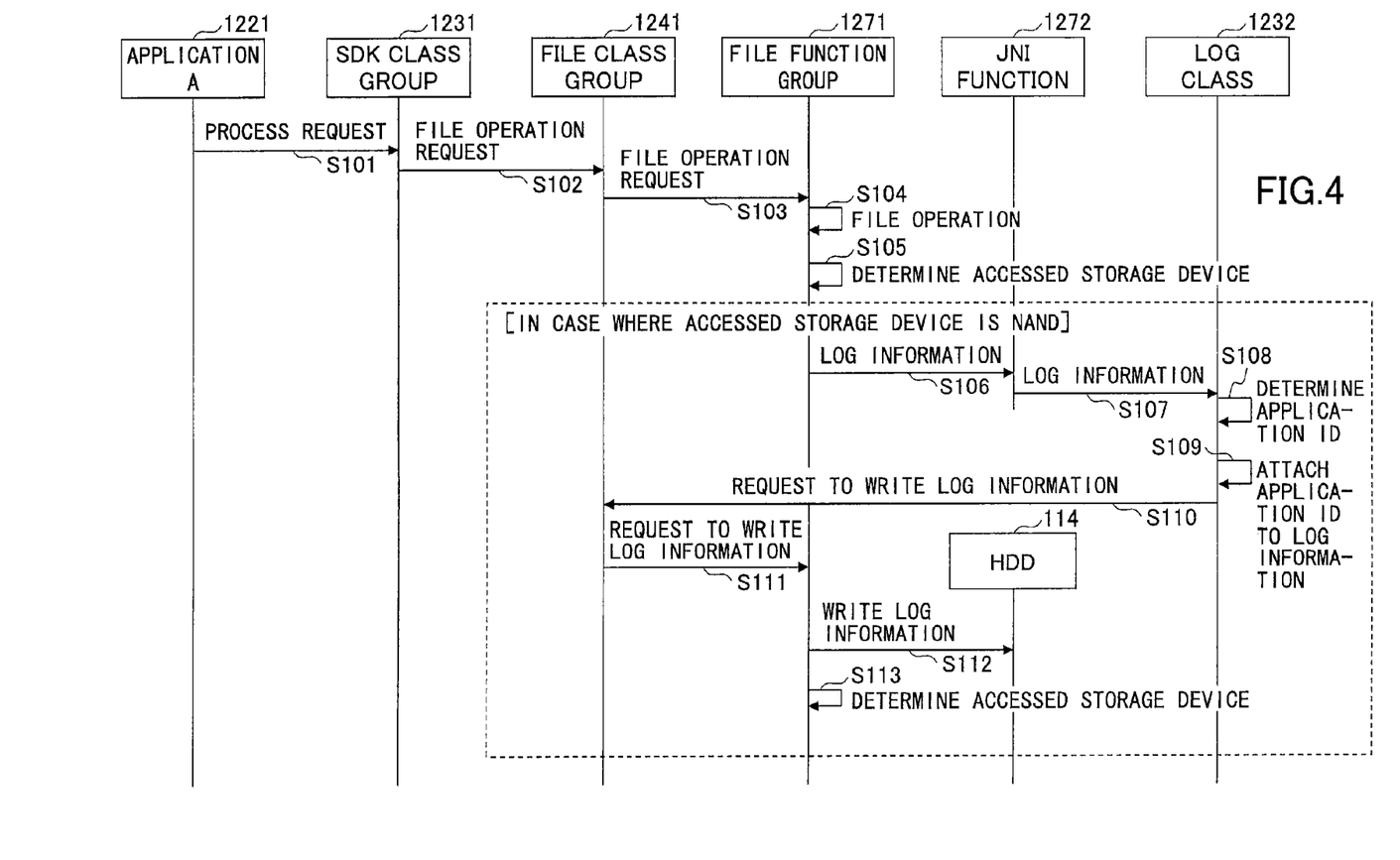
FIG. 4 is a sequence diagram for illustrating one example of a procedure executed by the image forming apparatus.

Below, a procedure to be executed by the image forming apparatus 10 will be described. FIG. 4 is a sequence diagram for illustrating one example of a procedure executed by the image forming apparatus 10. Note that although the process shown in FIG. 4 is carried out by the image forming apparatus 10 according to the respective programs, descriptions will be made as if the programs execute the process, for the sake of convenience.

In step S101, the application A 1221 invokes a certain SDK API. That is, the application A 1221 makes a certain process request to the SDK platform 123. As a result, the method of the class in the SDK class group 1231 corresponding to the SDK API is invoked. In a case where a file operation is required in a process within the method, the class invokes the function (for example, "open", "write", "read", "close", "generating a folder" or the like) corresponding to the file operation from among the file function group 1271 (step S103). The invoked function will be referred to as an "object function", hereinafter.

The object function executes the file operation corresponding to the object function (step S104). As a result, access to the storage device, that is, the HDD 114, the NAND-type flash memory 116 or the SD card 80 is carried out. Note that the SD card 80 should not necessarily be inserted in the SD card slot 17.

Subsequently, the object function determines whether the thus accessed storage device is the NAND-type flash memory 116 (step S105). The accessed storage device can be determined based on the path name of the accessed file, since a top part of the path name of the accessed file is different for each of the storage devices. Note that the path name is designated in the argument when the object function is the "open" function. When the object function is other than the "open" function, a file identifier is designated in the argument. Therefore, a configuration may be provided such that it is possible to determine the path name based on the file identifier. Specifically, within the "open" function, correspondence information between the file identifiers and the path names is stored, for example, in the RAM 112. The function other than the "open" function can determine the file name corresponding to the file identifier designated in the argument based on the correspondence information.

In a case where the accessed storage device is the NAND-type flash memory 116 in step S105, the process starting at step S106 is carried out. In step S106, the object function designates log information that indicates the executed file operation, and invokes the JNI function 1272. The log information includes, for example, values for items such as a thread name, a path name, a size, an operation type name and date and time information.

The thread name is the thread name of the thread to which the current process belongs. The path name is the path name of the operated file. The size is the writing size (written) to the operated file. Therefore, the item "size" is meaningful in a case where the object function is the "write" function. In a case where the object function is other than the "write" function, the value of the item "size" can be zero. The operation type name is an identification name of the type of the file operation. The operation type name may be, for example, the function name of the object function. The date and time information is a character string indicating the current date and time. Note that the thread name and the date and time information can be obtained as a result of querying the OS 126.

Next, the JNI function 1272 designates the log information, and invokes a predetermined method in the log class 1232 (step S107). Next, the log class 1232 determines identification information (hereinafter, referred to as an "application ID") of the application in the SDK applications 122 that has made the process request resulting in the file operation being required (step S108). A specific method of determining the application ID will be described later. After the application ID of the application A 1221 is thus obtained in step S108, the log class 1232 attaches the obtained application ID to the log information (step S109). Next, the log class 1232 requests the file class group 1241 to write the log information in a log file (step S110). The file class group 1241 then requests the file function group 1271 to write the log information (step S111). Note that steps S110 and S111 are carried out a plurality of times for one set of log information such as, to "open" the log file, to "write" the log information to the log file and then, to "close" the log file. Next, the file function group 1271 writes the log information to the log file in the HDD 114 (step S112).

Figure 5:
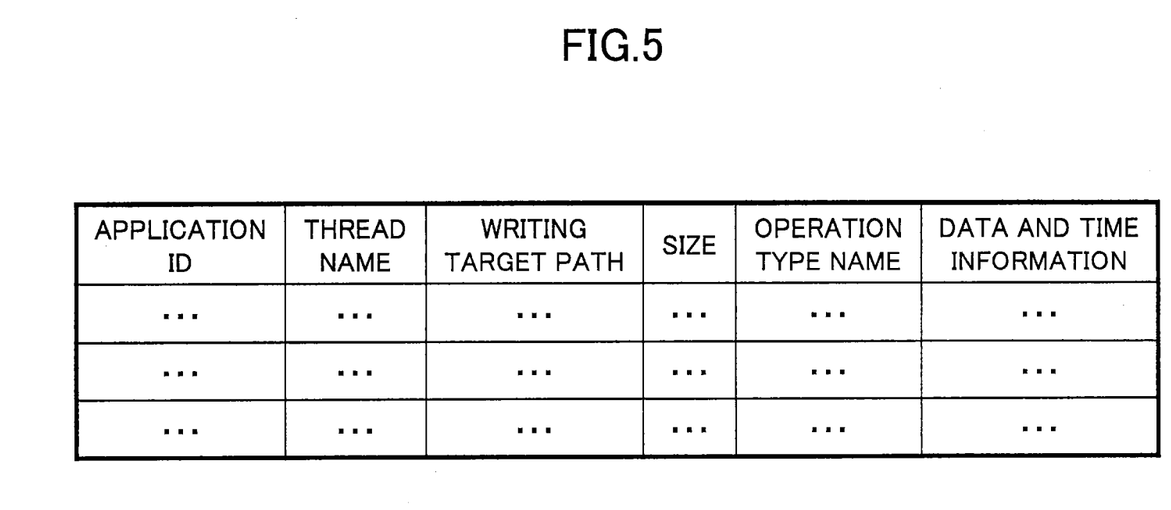
FIG. 5 illustrates one example of information which is recorded in a log file.

FIG. 5 illustrates one example of information to be recorded in the log file. The first line in FIG. 5 corresponds to one set of the log information. As shown in FIG. 5, in the log file, for each set of log information, the application ID, the thread name, the path name ("WRITING TARGET PATH" in FIG. 5), the size, the operation type name, the date and time information and so forth are recorded.

Next, the same as step S105, the file function group 1271 determines whether the accessed storage device is the NAND-type flash memory 116 (step S113). Since the log file is stored in the HDD 114, the accessed storage device is not the NAND-type flash memory 116. Therefore, in a case of writing the log information, the same process as that starting at step S106 is not carried out thereafter.

Note that, in FIG. 4, such a configuration has been described that the file class group 1241 is invoked via the SDK class group 1231. However, the SDK application 122 such as the application A 1221 can directly invoke the file class group 1241. A procedure to be carried out in this case is the same as that starting at step S103.

Further, it is not necessary that step S110 be carried out in synchronization with step S107. For example, it is possible that the log class 1232 caches the log information for a predetermined number of times or a predetermined amount in the RAM 112 or the like. Then, it is possible to carry out the process starting at step S110 in timing when the cached log information has reached for the predetermined number of times or the predetermined amount. Further, it is also possible that, in a case where the image forming apparatus 10 is in the power saving state, the log class 1232 caches the log information without regard to the above-mentioned predetermined number of times or the above-mentioned predetermined amount. This is because, in the case of the power saving state, writing the log information to the HDD 114 to which the log information is to be written cannot be carried out.

Next, the above-mentioned specific method of determining the application ID in step S108 will be described.

The SDK applications 122 are Java (registered trademark) applications. Therefore, for example, it is possible to identify each of the SDK applications 122 using a ThreadGroup that is a standard class in Java (registered trademark). A ThreadGroup is a collection of threads or ThreadGroups, and one or more threads can be associated with a ThreadGroup. Further, it is possible to associate a name (ThreadGroup name) with a ThreadGroup. Further, in the J layer, it is possible to obtain, based on the thread name, the ThreadGroup name of the ThreadGroup to which the thread concerning the thread name belongs.

The SDK platform 123 allocates one ThreadGroup to one SDK application 122, and sets, as the ThreadGroup name, the application ID of the SDK application 122 that corresponds to the ThreadGroup, for each ThreadGroup. Thereby, the log class 1232 belonging to the J layer can obtain the ThreadGroup name, i.e., the application ID, based on a thread name included in log information.

That is, it is also possible that the file function group 1271 carries out writing log information technically. In this case, the JNI function 1272 and the log class 1232 become unnecessary. However, since the file function group 1271 belongs to the N layer, it cannot obtain the ThreadGroup name based on a thread name. Therefore, according to the embodiment, such a configuration is provided that, for a request for a file operation transmitted down to the N layer, the log information is written by the log class 1232 in the J layer.

However, it is also possible that the application ID is determined using a different method. For example, concerning the HDD 114, the NAND-type flash memory 116, the SD card 80 and so forth, it is possible to allocate work areas for the respective SDK applications 1221. Specifically, it is possible to generate folders or directories for the respective SDK applications 122, and each SDK application 122 can write information in the corresponding folder or below the corresponding directory.

In this case, the file function group 1271 can determine the identification information of each SDK application 122 such as the application ID based on the path name of the operated file. That is, in each path name, the folder name or the directory name is to be included for distinguishing the corresponding SDK application 122. Since the folder name or the directory name has a different value for each SDK application 122, it is possible to determine the identification information of the corresponding SDK application 122. The folder names or the directory names may be the same as the application IDs of the corresponding SDK applications 122, respectively.

In a case where it is possible to determine an application ID by the file function group 1271, it is possible that the file function group 1271 writes log information in the log file.

Alternatively, it is also possible that the log class 1232 is invoked via the JNI function 1272.

As described above, according to the embodiment, for respective operations carried out on the NAND-type flash memory 116, the sets of log information are recorded in a state of the corresponding SDK applications 122 being able to be determined. Therefore, it is possible to assist in obtaining the use state of each SDK application 122 as to how the NAND-type flash memory 116 is used by the SDK application 122. For example, a developer who develops a SDK application 122 can determine whether the use state of the SDK application 122 as to how the NAND-type flash memory 116 is used by the SDK application 122 is in conformity with the guideline by checking the log file at a time of testing the SDK application 122, or the like.

Further, it is possible, in a case where trouble has occurred concerning the NAND-type flash memory 116, to improve the likelihood of being able to determine the corresponding SDK application 122 that is the cause of the trouble, by checking the log file.

Further, the embodiment does not require a change in interfaces for the SDK applications 122. Therefore, it is possible to implement the embodiment without changing the implementations of the SDK applications 122.

Note that the place in which the log information is recorded is not limited to the storage device that the image forming apparatus 10 has. For example, it is also possible to use a storage device connected to the image forming apparatus 10 via a network as the place in which the log information is recorded.

Further, the embodiment can be applied to any of various apparatuses, other than the image forming apparatus 10, in which an application(s) can be installed. These apparatuses may include a projector, a digital camera, a video conference system, and so forth.

Note that in the embodiment, a request for a file operation is one example of a use request for a storage part. Further, the APIs that the file class group 124 in the JVM 124 have and the SDK APIs are examples of a predetermined interface. Further, the NAND-type flash memory 116 is one example of a first storage part. The HDD 114 is one example of a second storage part. The RAM 112 is one example of a third storage part. Further, the log class 1232 or the file function group 1271 is one example of a determination part. The log class 1232 is one example of a storage unit.

Further, according to the embodiment, one example of a method in which an application developed using an open API causes an apparatus to carry out a process has been described using the provision style called "SDK". However, the present invention is not limited to such a specific provision style.

The apparatus, the non-transitory computer readable information recording medium and the information recording method have been described in the embodiment. However, the present invention is not limited to the specifically disclosed embodiment, and variations and modifications may be made without departing from the scope of the present invention.

The present application is based on and claims the benefit of priority of Japanese Priority Application No. 2013-023466 filed on Feb. 8, 2013 and Japanese Priority Application No. 2013-199767 filed on Sep. 26, 2013, the entire contents of which are hereby incorporated herein by reference.

Prior Art Documents
Japanese Laid-Open Patent Application No. 2006-079211
Japanese Laid-Open Patent Application No. 2009-290464

What is claimed is:

1. An apparatus comprising:
a controller that
determines, from among a plurality of storage devices, whether an accessed storage device that has been accessed is a first storage device,
determines, for a use request for using the first storage device, identification information for identifying a program that has issued the use request through a predetermined interface, in response to the accessed storage device being the first storage device,
stores the identification information in a second storage device different from the first storage device, in response to the accessed storage device being the first storage device, and
stores the identification information in a third storage device different from the first storage device and the second storage device, when the apparatus is in a power saving state and in response to the accessed storage device being the first storage device, wherein
the first storage device corresponds to a NAND flash memory, and
the controller determines whether the accessed storage device is the first storage device based on a path name of a file, a part of the path name of the file being different for each of the first, second, and third storage devices.

2. The apparatus as claimed in claim 1, wherein
the identification information includes any of a name of a thread of a process that is executed in response to invoking carried out via the predetermined interface, and the path name of the file.

3. The apparatus as claimed in claim 1, wherein
the controller determines the identification name based on a name of a ThreadGroup to which a thread executed in response to invoking carried out via the predetermined interface belongs.

4. The apparatus as claimed in claim 1, wherein
the controller determines the identification information based on the path name of the file that is designated to be operated in the use request.

5. The apparatus as claimed in claim 1, wherein
the second storage device is connected to the apparatus via a network.

6. The apparatus as claimed in claim 1, wherein
the use request for using the first storage device is a request for a file operation to carry out an operation of opening a file, closing a file, writing information to a file, reading information from a file or generating a folder or a directory, the file being stored in the first storage device.

7. The apparatus as claimed in claim 1, wherein the second storage device corresponds to an HDD, and the third storage device corresponds to a RAM.

8. A non-transitory computer readable information recording medium storing an information storing program that, when executed by one or more processors, causes an apparatus to execute a method, the method comprising:
determining, from among a plurality of storage devices, whether an accessed storage device that has been accessed is a first storage device;
determining, for a use request for using the first storage device, identification information for identifying a program that has issued the use request through a predetermined interface, in response to the accessed storage device being the first storage device;

storing the identification information in a second storage device different from the first storage device, in response to the accessed storage device being the first storage device; and storing the identification information in a third storage device different from the first storage device and the second storage device, when the apparatus is in a power saving state and in response to the accessed storage device being the first storage device, wherein the first storage device corresponds to a NAND flash memory, and the determining determines whether the accessed storage device is the first storage device based on a path name of a file, a part of the path name of the file being different for each of the first, second, and third storage devices.

9. The non-transitory computer readable information recording medium as claimed in claim 8, wherein the identification information includes any of a name of a thread of a process that is executed in response to invoking carried out via the predetermined interface, and the path name of the file.

10. The non-transitory computer readable information recording medium as claimed in claim 8, wherein the determining determines the identification name based on a name of a ThreadGroup to which a thread executed in response to invoking carried out via the predetermined interface belongs.

11. The non-transitory computer readable information recording medium as claimed in claim 8, wherein the determining determines the identification information based on the path name of the file that is designated to be operated in the use request.

12. The non-transitory computer readable information recording medium as claimed in claim 8, wherein the second storage device is connected to the apparatus via a network.

13. The non-transitory computer readable information recording medium as claimed in claim 8, wherein the use request for using the first storage device is a request for a file operation to carry out an operation of opening a file, closing a file, writing information to a file, reading information from a file or generating a folder or a directory, the file being stored in the first storage device.

14. An information recording method for an apparatus, the information recording method comprising:

determining, from among a plurality of storage devices, whether an accessed storage device that has been accessed is a first storage device;

determining, using a controller, for a use request for using the first storage device, identification information for identifying a program that has issued the use request through a predetermined interface, in response to the accessed storage device being the first storage device;

storing the identification information in a second storage device different from the first storage device, in response to the accessed storage device being the first storage device; and storing the identification information in a third storage device different from the first storage device and the second storage device, when the apparatus is in a power saving state and in response to the accessed storage device being the first storage device, wherein the first storage device corresponds to a NAND flash memory, and the determining determines whether the accessed storage device is the first storage device based on a path name of a file, a part of the path name of the file being different for each of the first, second, and third storage devices.

15. The information recording method as claimed in claim 14, wherein the identification information includes any of a name of a thread of a process that is executed in response to invoking carried out via the predetermined interface, and the path name of the file.

16. The information recording method as claimed in claim 14, wherein the determining determines the identification name based on a name of a ThreadGroup to which a thread executed in response to invoking carried out via the predetermined interface belongs.

17. The information recording method as claimed in claim 14, wherein the determining determines the identification name based on the path name of the file that is designated to be operated in the use request.

18. The information recording method as claimed in claim 14, wherein the second storage device is connected to the apparatus via a network.

* * * * *